United States Patent [19]

Baker

[11] Patent Number: 4,638,537
[45] Date of Patent: Jan. 27, 1987

[54] CONCISE QUICK RELEASE TOOL HOLDER

[75] Inventor: Gary L. Baker, Portland, Mich.

[73] Assignee: Crankshaft Machine Company, Jackson, Mich.

[21] Appl. No.: 725,494

[22] Filed: Apr. 22, 1985

[51] Int. Cl.⁴ .............................. B23B 3/18; B23B 7/04
[52] U.S. Cl. ................................................ 29/40; 82/3; 279/50; 408/42
[58] Field of Search ...................... 29/37 R, 37 A, 565, 29/39-41, 48.5 R; 279/50, 51, 52, 76, 82; 82/3; 408/35, 42-44

[56] References Cited

U.S. PATENT DOCUMENTS

| | | | |
|---|---|---|---|
| 632,560 | 9/1899 | Furbish | |
| 1,209,572 | 12/1916 | Fegley | |
| 1,783,565 | 12/1930 | Garey | 29/37 R |
| 1,929,869 | 10/1933 | Hässner | 279/76 |
| 2,400,183 | 5/1946 | Wilson | 279/50 |
| 2,680,636 | 6/1954 | Griffin | 279/76 X |
| 3,339,440 | 9/1967 | Tsuda | 82/3 |
| 3,720,417 | 3/1973 | Smith | 279/82 |
| 3,726,162 | 4/1973 | Sato | 82/3 |
| 4,054,975 | 10/1977 | Lundstrom | 29/40 X |
| 4,395,051 | 7/1983 | Tonomura | 279/75 |

Primary Examiner—Gil Weidenfeld
Assistant Examiner—Steven C. Bishop
Attorney, Agent, or Firm—Beaman & Beaman

[57] ABSTRACT

A quick release tool holder system for machine tools utilizing a plurality of rotatable tool spindles spaced about an axis located on a tool head. Each tool spindle utilizes an axially movable sleeve for operating a detent locking a standard tool adapter within the spindle socket, and an actuator plate reciprocable by an expansible chamber motor simultaneously displaces the spindle sleeves in a tool adapter releasing direction to facilitate tool replacement.

10 Claims, 7 Drawing Figures

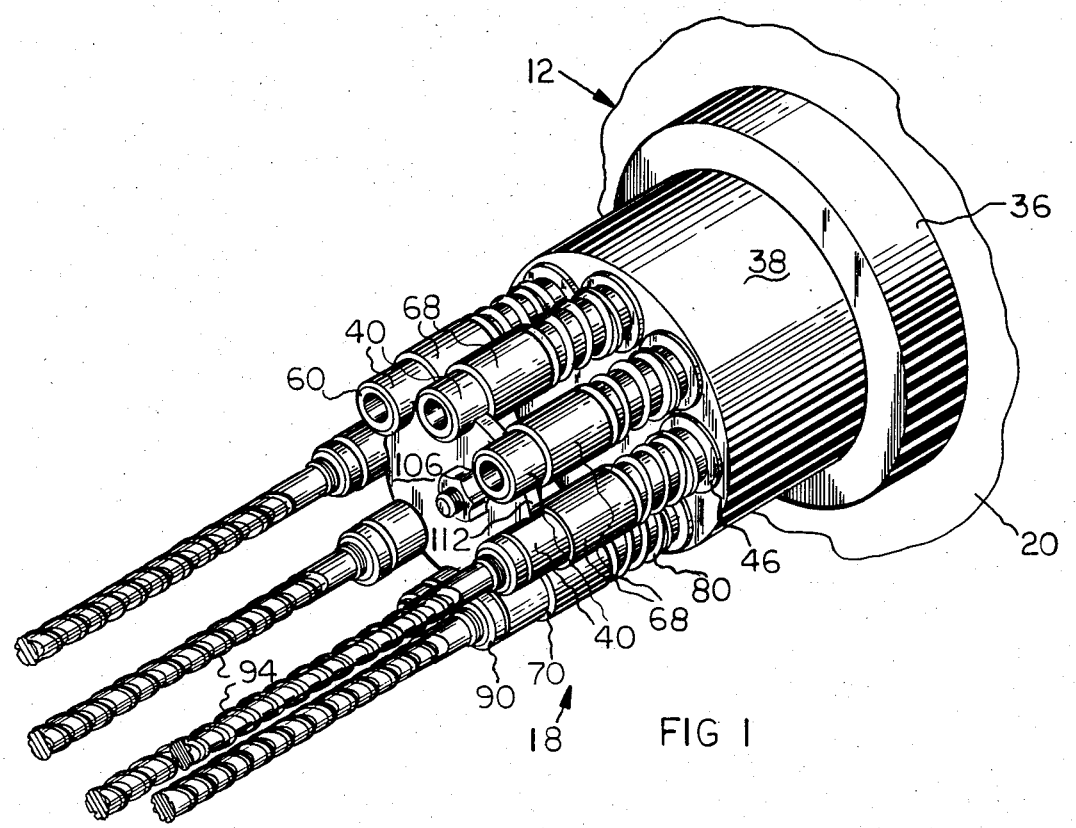
FIG 1
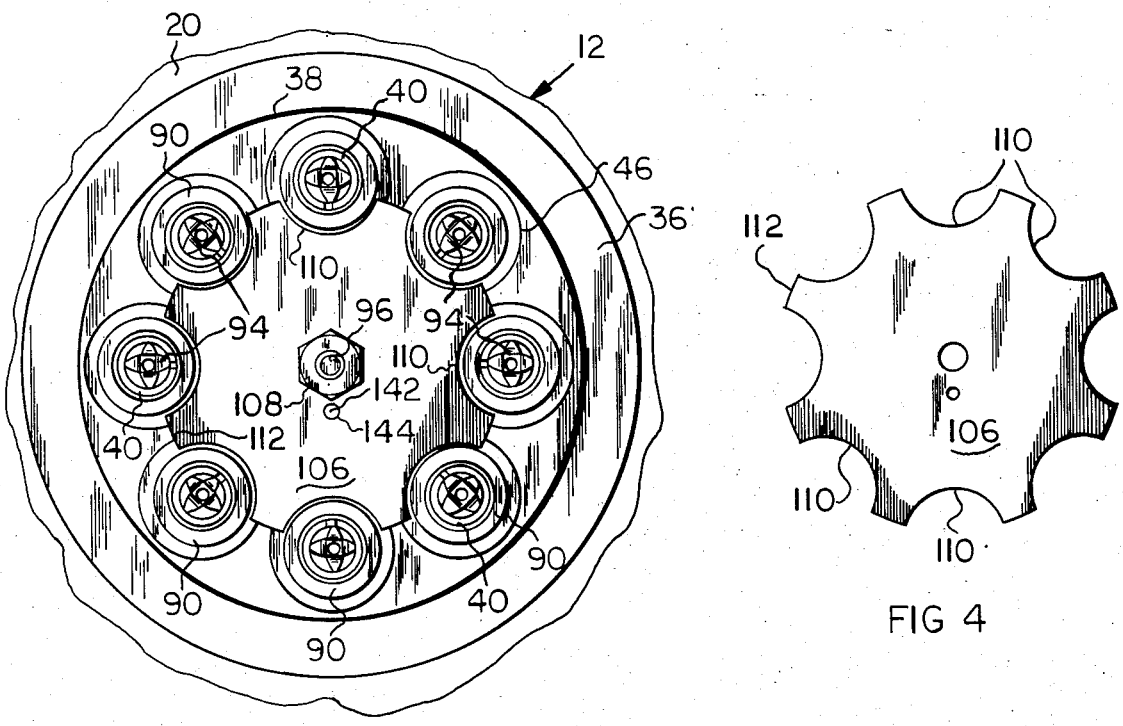
FIG 3
FIG 4

CONCISE QUICK RELEASE TOOL HOLDER

BACKGROUND OF THE INVENTION

Machine tools commonly mount a plurality of rotating tool spindles in close relationship to each other wherein a plurality of tools, drills, for instance, may be simultaneously rotated and axially displaced to drill a plurality of holes in a pattern determined by the location of the tool spindles. As the tools must be periodically replaced for sharpening, or other reasons, various types of chucks and tool holders are employed with the spindles to releasably hold the tool within the spindle in an accurate manner.

When the tool spindles are located in a concise pattern and there is little clearance between adjacent spindles, the configuration and dimensions of the chucking and tool holding apparatus becomes significant as the minimum spacing between adjacent tools may be largely determined by the space required by the tool holding apparatus. Tool holders for use with rotatable spindles have been developed which are of a concise configuration and yet are capable of firmly locating and holding a tool, or the tool adapter, within the spindle socket. Concise tool holding arrangements for use with spindles are shown in U.S. Pat. No. 3,720,417 and 4,395,051.

While concise spindle tool holder chucking and holding devices are known, it is often desirable to simultaneously change or replace a plurality of tools which are closely oriented to each other in a predetermined pattern, and the close proximity of adjacent tool spindles renders the operation of the tool releasing and latching apparatus difficult and time consuming, and the proximity of adjacent tool spindles complicates tool changing and replacement procedures.

It is an object of the invention to provide a quick release tool holder system for a machine tool wherein the tools are concisely related to each other with a minimum of clearance between adjacent tools and spindles.

A further object of the invention is to provide a quick release tool holder system for machine tools wherein a plurality of rotating tool spindles concisely oriented to each other and each utilizing a separate releasable tool holder may be simultaneously actuated to permit simultaneous tool replacement in a short duration of time.

Yet another object of the invention is to provide a quick release tool holder system for machine tools wherein a plurality of concisely oriented rotating spindles are mounted upon a rotatable head each employing a tool holder wherein the tool holders of adjacent spindles may be simultaneously released by a motor stationarily mounted with respect to the rotating head.

In the practice of the invention a machine tool includes a head rotatable about an axis. A plurality of tool stations are mounted upon the head wherein the head may be indexed about its axis to sequentially present the tool stations in alignment with a workpiece for machining purposes. Each tool station includes a plurality of spindles rotatably mounted upon the head in parallel relationship to each other and in a predetermined pattern. Each spindle includes an outer free end having a socket defined therein for receiving a standard tool adapter in which is mounted a tool, such as a drill, reamer, or the like.

Each spindle includes tool holder or chuck apparatus adjacent its outer end for retaining the tool adapter within its socket. This tool holding apparatus, in accord with the invention, includes a radially movable detent mounted upon the spindle displaceable into the spindle socket for locking engagement with the tool adapter by a cam surface defined on a cylindrical sleeve reciprocably mounted on the spindle exterior. A spring mounted on the spindle biases the sleeve in a direction forcing the detent into engagement with the tool adapter for retaining the adapter within the spindle socket, and upon movement of the sleeve in the opposite direction toward the spring, the detent releases the adapter and permits the adapter to be readily pulled from the spindle socket.

In accord with the invention, all of the detent operating sleeves of a tool station may be simultaneously translated in the tool adapter releasing direction, and held in the tool adapter releasing position permitting all of the tools to be readily replaced and changed.

Simultaneous actuation of the spindle sleeves is by an actuator plate disposed perpendicular to the length of the spindles having openings therein for receiving the spindles, but the dimension of the openings is less than the diameter of the sleeves. The plate is located adjacent the outer end of the sleeves and is mounted on an actuator shaft reciprocably mounted within the machine tool head and connected at its inner end with a linear motor for axially translating the shaft. Movement of the actuator plate in the direction of the sleeves abuts the plate against all of the spindle sleeves at the tool station simultaneously displacing the sleeves to the tool release position. The plate will hold the sleeves in this position and the tools and tool adapters may be readily removed from the spindle sockets.

The removed tool adapters and tools are replaced with sharpened tools mounted within the adapters, and the same are inserted into the spindle sockets. The linear motor translates the shaft and actuator in the opposite direction permitting the sleeves to be biased toward the tool holding position by springs associated with each sleeve, and in this manner all of the spindles at a common station are simultaneously restored to an operative condition, and the normal machining cycle of the apparatus continued.

In accord with the invention, the movement of the actuator shaft is by the reciprocating piston of an expansible chamber motor. To simplify installation, the motor is mounted upon a fixed portion of the machine tool fixed relative to the head wherein the head rotates relative to the motor. To interconnect the actuator plate shaft and the motor piston, a coupling is mounted upon the shaft inner end which is received within a coupling mounted upon the piston upon the actuator shaft and piston becoming coaxially aligned during the rotative indexing of the head. Thus, the motor is only connected to the actuator shaft when the piston and shaft are in alignment, and a single motor may be used to operate the actuator plates of a plurality of tool stations.

BRIEF DESCRIPTION OF THE DRAWINGS

The aforementioned objects and advantages of the invention will be appreciated from the following description and accompanying drawings wherein:

FIG. 1 is a perspective view of a spindle tool station utilizing the concepts of the invention, three of the tools being removed for purpose of illustration, FIG. 3 is an end elevational view of the tool station as taken from the left of FIGS. 1 and 2, FIG. 4 is an elevational view of the actuator plate, per se.

DESCRIPTION OF THE PREFERRED EMBODIMENT

A quick release tool holder system in accord with the invention can be utilized with a wide variety of machine tools wherein it is desired to locate a plurality of parallel rotating tools in close proximity to each other. For instance, the invention can be used to drill, ream or broach a plurality of holes in a workpiece, and in a commercial embodiment of the invention a plurality of drills are used to produce holes within an internal combustion engine crankshaft, the holes being equally radially spaced from a central axis.

Figure 2:
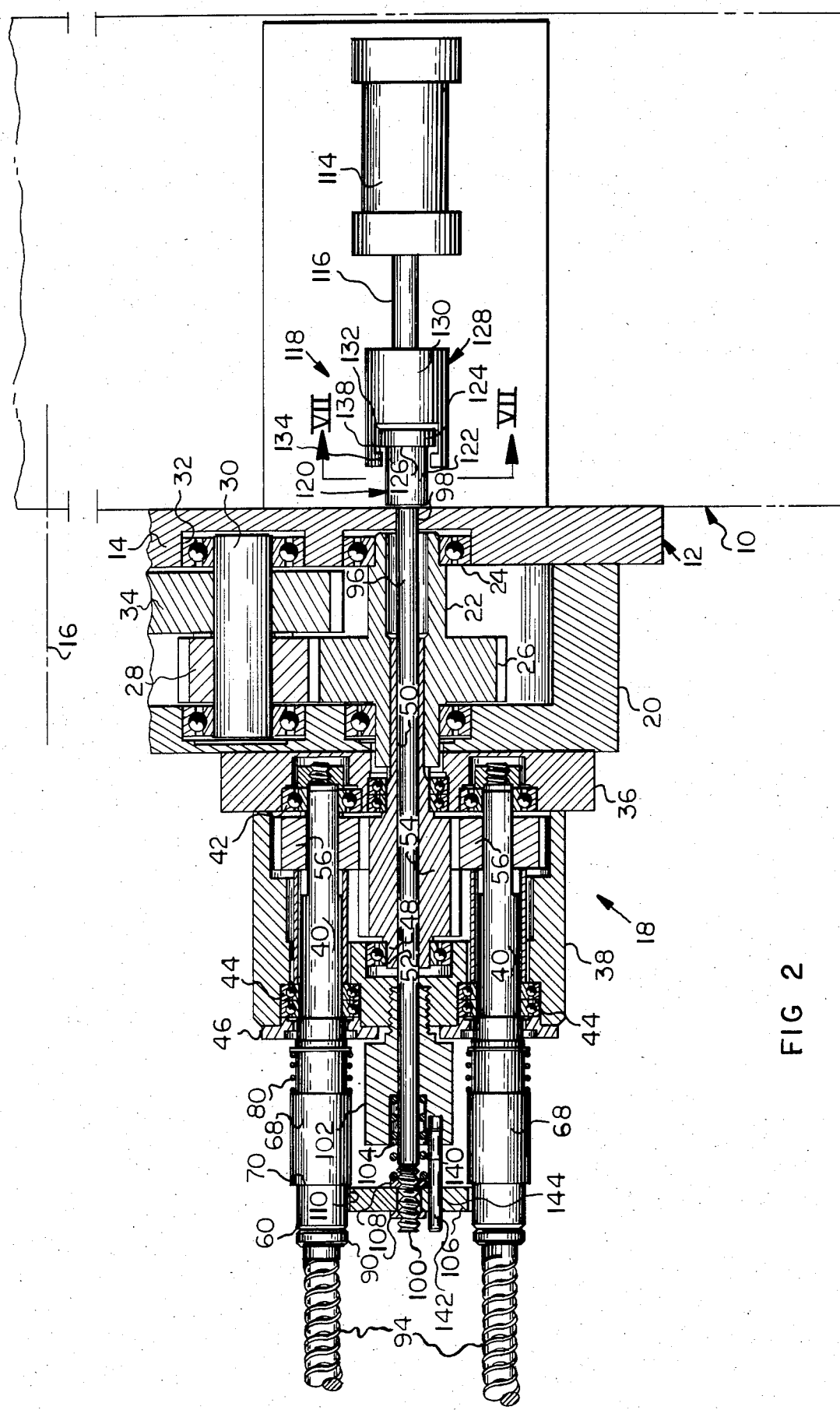
FIG. 2 is an elevational, sectional view taken through the tool station illustrating the machine tool head and expansible motor.

In FIG. 2 a fixed machine tool frame is schematically represented at 10, the frame may be of a heavy cast construction including a base which rests upon a supporting surface, and conventional ways, stocks, columns, and other known machine tool components may be defined and supported upon the frame. One such common component is a tool supporting head 12 including a plate 14 upon the frame for rotation about an axis represented at 16 on bearings, not shown. A plurality of tool stations 18 are mounted upon the head 12, and the head is indexed about the axis 16 by known indexing mechanism to sequentially locate a tool station in alignment with the workpiece to be machined. In the drawings a single tool station 18 is illustrated, and it is to be appreciated that similar tool stations, not shown, may be located upon the head.

With reference to FIG. 2, the head 12 includes a front housing 20, and the shaft 22 is rotatably mounted with the head upon anti-friction ball bearings 24. The shaft 22 includes gear 26 which meshes with gear 28 fixed upon the shaft 30 also located within the head and mounted upon bearings 32. The shaft 30 includes a gear 34 which meshes with a drive gear, not shown, concentric with the axis 16 whereby rotative power may be transmitted to the shaft 22.

The spindle tool station 18 is mounted upon the head front housing 20 and is of a cylindrical configuration concentric to the shaft 22. The station support base 36 has a cylindrical spindle barrel 38 fixed thereon, and in the disclosed embodiment, eight spindles 40 are rotatably mounted within the barrel 38 in parallel relationship. The spindles 40 are each rotatably supported upon bearings 42 mounted in the spindle support base 36, and anti-friction bearings 44 mounted adjacent the outer end of the barrel 38 and held in position by the bearing nuts 46.

A shaft 48 includes a reduced diameter portion 50 received within and keyed to the shaft 22, and the shaft 48 is supported within the barrel 38 upon bearings 52. A gear 54 is defined upon the shaft 48, and this gear meshes with gears 56 keyed to each of the spindles 40.

Thus, it will be appreciated that all eight of the spindles 40 rotate in a common direction due to their meshing with the gear 54 which is driven through gears 26, 28 and 34.

The tool spindles 40 each include a cylindrical outer end projecting from the barrel 38. The construction of the outer end of the spindles is best appreciated from FIG. 5 wherein it is noted that a cylindrical socket 58 is defined in the spindles intersecting the outer end 60. The socket is provided with a keyway 62, FIG. 6, and a radial opening 64 having non-parallel sides is defined in the spindle wall and intersects the socket and receives the detent 66 which is capable of limited radial movement relative to the spindle axis. A cylindrical sleeve 68 is slidably mounted upon the cylindrical end of the spindles 40 for movement between tool holding and tool release positions. The sleeve 68 includes an outer end 70, and an inner end 72, and internally, a conical cam surface 74 engages the detent 66 whereby movement of the sleeve toward the right, FIG. 5, moves the detent radially inwardly, while movement of the sleeve toward the left, FIG. 5, permits the detent to move radially outwardly.

A snap ring 76 is mounted within a groove 78 on each spindle, and a compression spring 80 interposed between the snap ring and the sleeve end 72 biases the sleeve 68 in the tool holding direction.

Figure 5:
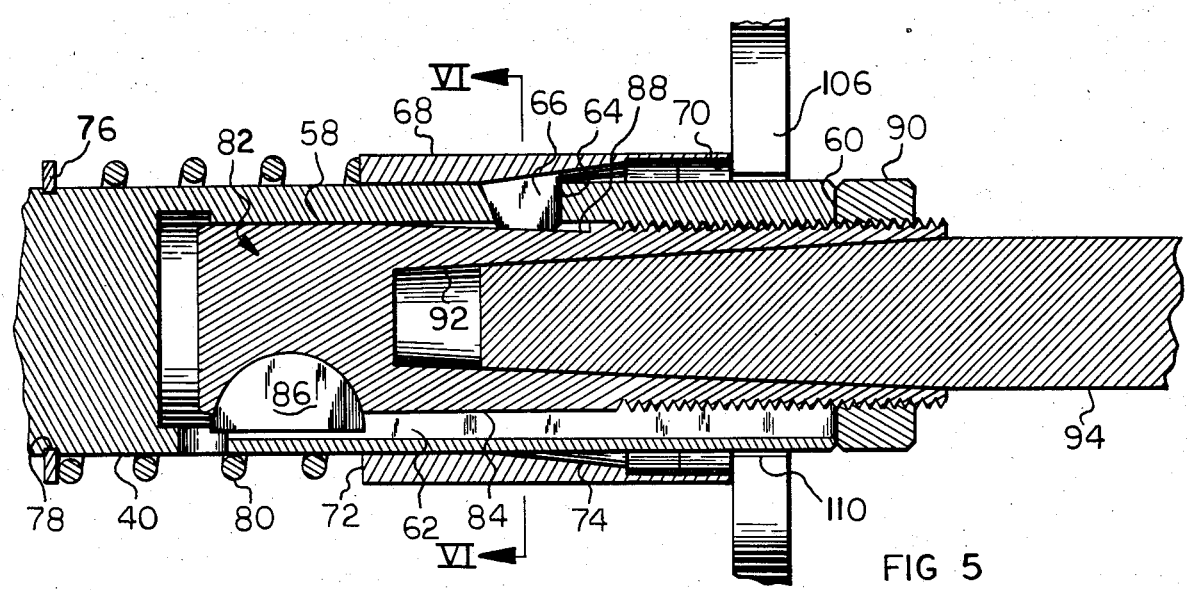
FIG. 5 is an enlarged, elevational, sectional view of the outer end of a spindle in accord with the invention.
Figure 6:
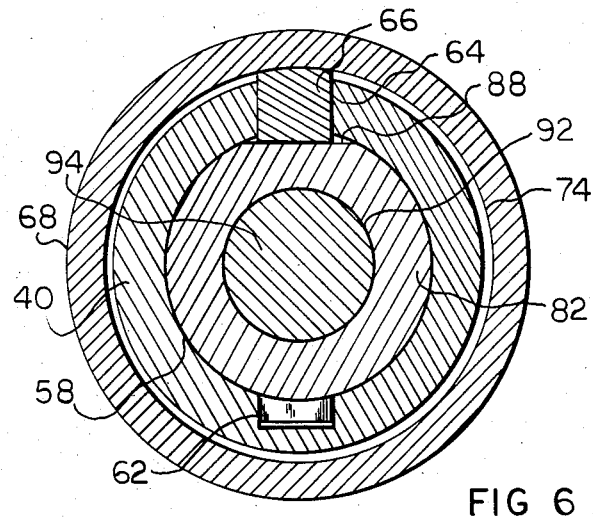
FIG. 6 is a diametrical, sectional view taken along Section VI—VI of FIG. 5.

The spindle socket 58 receives a conventional tool adapter 82 as shown in FIG. 5. Such an adapter includes a cylindrical stem 84 closely received within the socket 58 having a key 86 cooperating with the spindle keyway 62 to prevent rotation of the adapter relative to the spindle. An oblique surface or flat 88 is defined on the adapter for engagement by the detent 66, as will be appreciated from FIGS. 5 and 6, and under the influence of the spring 80, the sleeve 68 will force the detent 66 into engagement with the adapter flat accurately and firmly retaining the adapter within the spindle socket.

The adapter 82 is threaded for receiving the adjustment nut 90, wherein rotation of the nut will determine the "depth" that the adapter is inserted into the socket 58. Upon engagement of the nut 90 with the spindle end 60, the adapter will be axially positioned with respect to the spindle, and set screws, or other locking apparatus, is used with the nut 90 to insure its proper position upon the adapter.

The adapter 82 is provided with the conventional tapered socket 92 for receiving the end of the tool 94, such as a drill, as illustrated, or broach, and the tool and described adapter are of conventional construction well known in the machine tool arts.

An actuator shaft 96 concentrically extends through the barrel 38 and shafts 22 and 48, FIG. 2, having an inner end at 98, and an outer end at 100. The shaft 96 is supported within the barrel for axial movement therein, and the adapter 102, FIG. 2, threaded into the barrel, provides firm support of the shaft adjacent its outer end and includes a concentric recess 104 for receiving the actuator plate spring, as later described.

The outer end 100 of the shaft 96 is threaded and an actuator plate 106 is mounted thereon by nuts 108 located on each side of the plate. The configuration of the actuator plate is best appreciated from FIG. 4. The plate is of a generally circular configuration having a plurality of circular notches 110 intersecting the plate periphery 112. The number of notches 110 correspond to the number of spindles 40 located at the tool station.

The actuator plate periphery 112 is substantially at a radial dimension equal with the center of the tool spindles 40, as will be appreciated from FIG. 3, and the radius of the notches 110 substantially corresponds to the radius of the spindle outer surface. The actuator plate 106 is axially located relative to the spindles for positioning adjacent the sleeves' outer ends 70, and as the radius of the notches 110 is less than the diameter of the sleeves 68, the actuator plate will be in alignment with the sleeves for abutting engagement with the sleeve outer ends 70 when the actuator plate is moved toward the sleeves.

In the preferred embodiment, an expansible chamber motor 114 supported upon the machine tool frame is used to axially displace the actuator plate shaft 96 and actuator plate 106. The motor 114, FIG. 2, may be of either a hydraulic or pneumatic type and includes a reciprocating piston 116.

As the head 12 and tool station 18 rotate about axis 16, and as the expansible motor 114 is stationary relative to the head, a coupling generally indicated at 118 is used to interconnect the piston 116 with the actuator shaft 96 upon these components becoming coaxially aligned. The coupling fitting 120 mounted upon the inner end 98 of the shaft 96 includes a hub 122 attached to the shaft having an enlarged cylindrical head 124 which includes an abutment shoulder 126. The coupling fitting 128 mounted upon the piston 116 includes a hub 130 having a diametrical passage 132 defined therethrough. A pair of fingers 134 extend away from the hub 130 and each includes an inwardly directed flange 134 terminating in a surface 136, FIG. 7. The distance between the surfaces 136 is slightly greater than the diameter of the fitting hub 122, but is less than the diameter of the head 124. The flanges 134 each include inner abutment surfaces 138 which are in axial alignment with the head abutment shoulder 126 when the head 124 is received within the passage 132.

Figure 7:
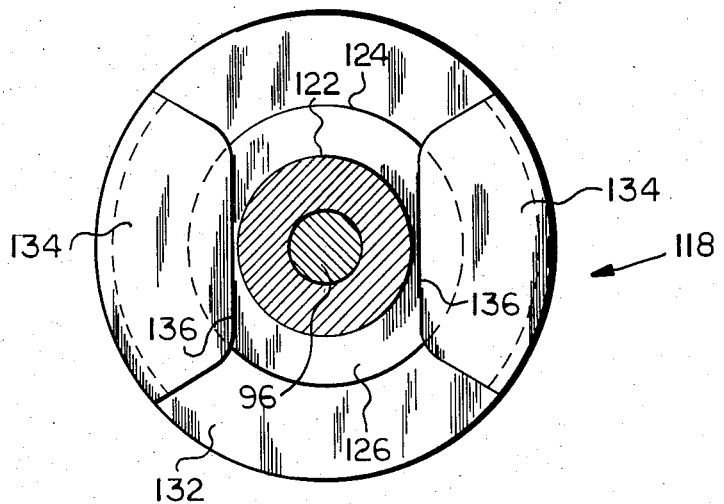
FIG. 7 is an enlarged, sectional view taken through the shaft-motor coupling along Section VII—VII of FIG. 2.

As the head 12 is rotated, each rotation thereof will cause the coupling fitting 120 to be received within the coupling fitting 128 as shown in FIGS. 2 and 7 when the shaft 96 and piston 116 are coaxially related, and an axial force transmitting relationship thereupon exists between the piston and the actuator shaft.

A compression spring 140 interposed between the adapter recess 104 and the inner nut 108 locating the actuator plate biases the actuator plate 106 and shaft 96 toward the left, FIG. 2, away from the sleeves 68. Relative rotation of the actuator plate 106 is prevented by the pin 142 mounted in the adapter 102 slidably received within the hole 144 defined in the actuator plate.

In operation, the head 12 will be rotated and indexed during its normal cycle of use presenting the various tool stations 18 in alignment with the workpiece, as is well known. The tool spindles 40 will be rotating through their gear drive system, and relative movement between the workpiece and tools will be produced by conventional work or tool feeding apparatus conventional in the art to permit the drills 40 to drill a plurality of holes within the workpiece, not shown. In the described embodiment, eight holes are being simultaneously drilled at an equal radial distance from the axis of the barrel 38, and uniformly spaced in a circumferential direction. The spring 140 will maintain the actuator plate 106 slightly out of engagement with the outer ends 70 of the sleeves 68, and the sleeve springs 80 will bias the sleeves of each spindle toward the spindle outer end maintaining the detent 66 in engagement with the tool adapter flat 88 accurately positioning and retaining the adapter 82 within the spindle socket 58.

When it is desired to change the tools of a work station 18 the head 12 is indexed to that position which coaxially aligns the piston 116 with the actuator shaft 96, and the coupling fittings 120 and 128 will be interconnected as shown in FIGS. 2 and 7. Upon introducing pressure into the expansible motor 114 to retract the piston 116 toward the right, FIG. 2, the surfaces 138 of fitting 128 will engage shoulder surfaces 126 of head 124 and draw the actuator shaft 96 toward the right, FIG. 2, compressing spring 140 and drawing the actuator plate 106 across the spindles into engagement with the outer ends 70 of the spindle sleeves 68. Movement of the sleeves 68 under the influence of the actuator plate permits the detents 66 to be radially displaced outwardly permitting the operator to quickly and easily remove the tools 94 and their associated adapters 82 from the spindle sockets. New or sharpened tools and adapters may be immediately inserted into the spindle sockets 58, the motor 114 is activated to extend the piston 116, and the actuator plate will be moved to the left, FIG. 2, under the influence of spring 140 permitting the spindle sleeves 68 to move toward the spindle outer ends 60 forcing the detents 66 inwardly to engage the adapter flats 88 and hold the adapters within their associated socket. Machining can then be continued with a minimum of down time for tool replacement.

It will be appreciated that the number of spindles at a tool station may vary from that disclosed. For instance, only two spindles may be employed at a station, and in such instance the actuator plate will be of such configuration as to cooperate only with two spindles. In the disclosed embodiment eight spindles are illustrated to emphasize the concise orientation of the apparatus, and by the use of the sliding sleeves 68 and the other disclosed features, including the actuator plate 106, it is possible to locate a plurality of relatively large drills or reamers in close proximity to each other, and yet provide quick release for the tools for maintenance and replacement purposes. Inadvertent release of the tools is prevented by the sleeve springs 80, and the actuator plate spring 140 will prevent the actuator plate from inadvertently engaging and displacing the sleeves unless under the influence of the motor 114. The use of the coupling 118 permits a single motor to function as the power means for a plurality of tool stations and the mounting of the motor in a fixed relationship to the tool head substantially reduces costs.

It is appreciated that various modifications to the inventive concepts may be apparent to those skilled in the art without departing from the spirit and scope of the invention.

I claim:

1. A quick release tool holder system for machine tools characterized by its concise configuration and ability to simultaneously release and hold a plurality of adjacent tools comprising, in combination, a frame, a machine tool head mounted on said frame, a plurality of elongated spindles mounted upon said head parallel to and substantially equally radially spaced from a center axis and each rotatable about its own spindle axis, drive means mounted on said head drivingly connected to said spindles for simultaneously rotating said spindles, each spindle including a free end, a socket defined in each spindle free end concentric to the associated spindle axis and shaped to receive a standard tool adapter, an annular sleeve exteriorly mounted upon each spindle in axial alignment with the associated socket and axially displaceable thereon in opposite tool releasing and tool holding directions, detent means mounted on each spindle interposed between the associated sleeve and socket operatively connected to the associated sleeve engaging and holding a tool adapter in said socket when the associated sleeve is moved in its tool holding direction and releasing the tool adapter when the asssociated sleeve is moved in its tool releasing direction, a sleeve actuator simultaneously operatively associated with the sleeves of all the tool spindles associated with a common center axis for simultaneously displacing all of the sleeves thereof in said tool releasing direction, and means connected to said actuator for axially displacing said actuator in a direction parallel to said center axis to simultaneously displace said sleeves in said tool releasing direction.

2. In a quick release tool holder system as in claim 1, a compression spring mounted upon each spindle biasing the associated sleeve in said tool holding direction.

3. In a quick release tool holder system as in claim 2, said actuator comprising a plate having a circumference, a plurality of openings defined in said plate circumference each slidably receiving a spindle, said sleeves being in axial alignment with said actuator plate adjacent said openings whereby displacement of said actuator plate parallel to said center axis in said tool releasing direction abutingly engages said actuator with said sleeves simultaneously displacing said sleeves in said tool releasing direction.

4. In a quick release tool holder system as in claim 1, said means connected to said actuator for axially displacing said actuator comprising a motor operatively connected to said actuator.

5. In a quick release tool holder system as in claim 4, said motor comprising an expansible chamber motor havinq a reciprocable piston operatively connected to said actuator.

6. In a quick release tool holder system as in claim 5, said machine tool head being rotatably positionably mounted upon said frame about an axis parallel to and offset with respect to said spindles' center axis, said motor being fixed relative to said head, an actuator shaft mounted in said head for reciprocable axial movement coaxial with said center axis, said actuator shaft having an outer end and an inner end, said sleeve actuator being mounted on said shaft outer end, a first coupling mounted on said shaft inner end, a second coupling mounted upon said motor piston adapted to laterally engage said first coupling, said first coupling engaging said second coupling in an axial force transmitting relationship at the rotational position of said head which coaxially aligns said actuator shaft with said motor piston.

7. In a quick release tool holder system as in claim 6, one of said couplings comprising an enlarged head, and the other coupling comprising a fitting having a laterally extending recess defined therein receiving said enlarged head, said fitting having diametrically opposed lateral openings intersecting said recess to permit lateral movement of said enlarged head into said recess and radially extending abutments defining the axial extent of said recess engaging said enlarged head upon relative axial movement of said piston to said actuator shaft.

8. A quick release tool holder system for machine tools characterized by its concise configuration and ability to simultaneously release and hold a plurality of adjacent tools comprising, in combination, a frame, a machine tool head mounted on said frame, a plurality of elongated spindles mounted upon said head parallel to and substantially equally spaced from a center axis and each rotatable about its own spindle axis, drive means mounted on said head drivingly connected to said spindles for simultaneously rotating said spindles, each spindle including a free end, a socket defined in each spindle free end concentric to the associated spindle axis and shaped to receive a standard tool adapter, an annular sleeve mounted upon each spindle in radial alignment with the associated socket and axially displaceable thereon in opposite tool releasing and tool holding directions, detent means mounted on each spindle interposed between the associated sleeve and socket operatively connected to the associated sleeve engaging and holding a tool adapter in said socket when the associated sleeve is moved in its tool holding direction and releasing the tool adapter when the associated sleeve is moved in its tool releasing direction, an actuator shaft axially reciprocably mounted within said head and coaxial with said center axis, said shaft having an outer end in axial alignment with said spindle sleeves and an inner end, a radially extending actuator plate rounted upon said shaft outer end, a plurality of openings defined in said actuator plate, each opening slidably receiving a spindle and the sleeve of each spindle being in axial alignment with said plate whereby axial movement of said actuator shaft and plate in said sleeve tool releasing direction causes said plate to simultaneously abut all of said sleeves and simultaneously displace said sleeves in said tool releasing direction, a spring interposed between said tool head and said actuator shaft biasing said shaft in said sleeve tool holding direction, an expansible chamber motor having a reciprocating piston mounted upon said frame and coupling means selectively connecting said shaft inner end and said piston to axially displace said shaft in said sleeve tool releasing position.

9. In a quick release tool holder system as in claim 8, said actuator plate having a circular periphery, said openings defined in said plate comprising circular segments intersecting said plate periphery having a radius less than the radius of said sleeves, said sleeves each having outer and inner ends, said plate being disposed adjacent said sleeves' outer ends for engagement therewith upon said plate being displaced in said sleeves' tool releasing direction.

10. In a quick release tool holder system as in claim 8, a compression spring mounted upon each spindle biasing the associated sleeve in said tool holding direction.

* * * * *